United States Patent
Oshins et al.

(10) Patent No.: US 10,795,718 B2
(45) Date of Patent: Oct. 6, 2020

(54) UPDATING HARDWARE WITH REDUCED VIRTUAL MACHINE DOWNTIME

(71) Applicant: Microsoft Technology Licensing, LLC, Redmond, WA (US)

(72) Inventors: Jacob Kappeler Oshins, Seattle, WA (US); Vadim Makhervaks, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 60 days.

(21) Appl. No.: 16/271,509

(22) Filed: Feb. 8, 2019

(65) Prior Publication Data
US 2020/0257547 A1 Aug. 13, 2020

(51) Int. Cl.
*G06F 9/455* (2018.01)

(52) U.S. Cl.
CPC ...... *G06F 9/45558* (2013.01); *G06F 9/45508* (2013.01); *G06F 2009/45583* (2013.01); *G06F 2009/45595* (2013.01)

(58) Field of Classification Search
CPC ............. G06F 9/45558; G06F 9/45508; G06F 2009/45583; G06F 2009/45595
See application file for complete search history.

(56) References Cited

U.S. PATENT DOCUMENTS

| | | | |
|---|---|---|---|
| 7,219,343 B2 | 5/2007 | Almeida et al. | |
| 7,478,173 B1* | 1/2009 | Delco | H04L 12/2865 709/250 |
| 8,028,071 B1* | 9/2011 | Mahalingam | H04L 69/32 370/254 |
| 8,341,624 B1* | 12/2012 | Hobbs | G06F 9/5011 709/204 |
| 8,418,166 B2 | 4/2013 | Armstrong et al. | |
| 8,484,653 B2 | 7/2013 | Tsirkin | |
| 9,384,132 B2 | 7/2016 | Chew | |
| 9,442,754 B1* | 9/2016 | Tsirkin | G06F 9/45558 |

(Continued)

OTHER PUBLICATIONS

"NVM Express Base Specification," Revision 1.3c, NVM Express Workgroup, May 24, 2018, 292 pages.

(Continued)

*Primary Examiner* — Adam Lee

(57) ABSTRACT

A technique is described herein for updating the logic used by a hardware accelerator provided by a computing device. In one implementation, the technique provides a pass-through mode which allows a virtual machine (provided by the computing device) to directly interact with the hardware accelerator. Upon the commencement of an updating operation, the technique instructs an emulator to begin emulating the function(s) of the hardware accelerator and the resultant effects of these functions, without interaction with the actual hardware accelerator. When the updating operation finishes, the technique re-enables the pass-through mode. By virtue of the above-summarized manner of operation, the technique allows the computing device to perform the function(s) associated with the hardware accelerator while the hardware accelerator is being updated. In one case, the technique disables the pass-through mode by modifying address-mapping information used by the virtual machine to access system physical addresses.

20 Claims, 8 Drawing Sheets

(56) References Cited

U.S. PATENT DOCUMENTS

| | | | | |
|---|---|---|---|---|
| 10,074,206 B1* | 9/2018 | Ingegneri | | G09G 5/363 |
| 10,102,605 B1* | 10/2018 | Ingegneri | | G06T 1/20 |
| 10,169,841 B1* | 1/2019 | Featonby | | G06F 9/45533 |
| 10,176,095 B2 | 1/2019 | Ferguson et al. | | |
| 2004/0049658 A1* | 3/2004 | Kabasawa | | G06F 9/3851 |
| | | | | 712/209 |
| 2005/0027965 A1* | 2/2005 | Yamada | | G06F 9/3879 |
| | | | | 712/34 |
| 2005/0216920 A1 | 9/2005 | Tewari et al. | | |
| 2007/0157211 A1* | 7/2007 | Wang | | G06T 1/20 |
| | | | | 719/313 |
| 2008/0222633 A1* | 9/2008 | Kami | | G06F 9/5077 |
| | | | | 718/1 |
| 2008/0298274 A1* | 12/2008 | Takashige | | H04L 41/08 |
| | | | | 370/254 |
| 2009/0164193 A1* | 6/2009 | McMillan | | G06F 30/33 |
| | | | | 703/13 |
| 2009/0222558 A1* | 9/2009 | Xu | | H04L 63/1408 |
| | | | | 709/224 |
| 2009/0292858 A1* | 11/2009 | Lambeth | | H04L 61/6022 |
| | | | | 711/6 |
| 2013/0055254 A1 | 2/2013 | Avasthi et al. | | |
| 2013/0091500 A1* | 4/2013 | Earl | | G06F 9/4555 |
| | | | | 718/1 |
| 2013/0155083 A1* | 6/2013 | McKenzie | | G06T 1/20 |
| | | | | 345/522 |
| 2014/0189862 A1* | 7/2014 | Kruglick | | G06F 9/5027 |
| | | | | 726/22 |
| 2015/0381495 A1* | 12/2015 | Cherian | | H04L 61/2592 |
| | | | | 370/392 |
| 2016/0246560 A1* | 8/2016 | Petrov | | G06F 9/452 |
| 2016/0321113 A1 | 11/2016 | Pinto et al. | | |
| 2017/0060607 A1* | 3/2017 | Hollinger | | G06F 9/5044 |
| 2017/0132747 A1* | 5/2017 | Wilt | | G06F 9/5044 |
| 2017/0149694 A1* | 5/2017 | Lakshmanan | | H04L 49/3045 |
| 2017/0329623 A1* | 11/2017 | Dong | | G06T 1/20 |
| 2018/0004564 A1* | 1/2018 | Konishi | | G06F 9/5016 |
| 2018/0018189 A1* | 1/2018 | Thomas | | G06F 8/77 |
| 2018/0121220 A1* | 5/2018 | Lei | | G06T 1/20 |
| 2018/0150391 A1* | 5/2018 | Mitchel | | H03M 7/6029 |
| 2018/0165082 A1 | 6/2018 | Batchelor et al. | | |
| 2018/0165785 A1* | 6/2018 | Kurtz | | G06F 9/5072 |
| 2018/0203715 A1 | 7/2018 | Granado | | |
| 2018/0210752 A1* | 7/2018 | Tang | | G06F 9/467 |
| 2018/0218473 A1* | 8/2018 | Hoppert | | G06F 9/45533 |
| 2018/0246749 A1 | 8/2018 | van Riel et al. | | |
| 2018/0293776 A1* | 10/2018 | Ray | | G06T 15/005 |
| 2018/0314540 A1* | 11/2018 | Iyer | | G06F 9/45558 |
| 2018/0373556 A1* | 12/2018 | Tian | | G06F 9/45558 |
| 2018/0374188 A1* | 12/2018 | Lv | | G06F 12/145 |
| 2019/0012489 A1* | 1/2019 | Gligor | | G06F 21/71 |
| 2019/0114197 A1* | 4/2019 | Gong | | G06F 9/45558 |
| 2019/0188148 A1* | 6/2019 | Dong | | G06F 12/1009 |
| 2019/0220301 A1* | 7/2019 | Zheng | | G06F 9/45558 |

OTHER PUBLICATIONS

"Citrix XenServer 6.1—New features," available at <<https://www.bit.lv/en/citrix-xenserver-6-1-jaunas-iespejas/>>, Bit IT Solutions, Baltijas Informācijas Tehnoloģijas, Ltd., Jun. 26, 2013, 3 pages.

Fornazier, Helen, "Increased performance of emulated NVMe devices," available at <<https://www.collabora.com/news-and-blog/blog/2016/08/23/increased-performance-of-emulated-nvme-devices/>>, Collabora Ltd., Aug. 26, 2008, 4 pages.

Ferguson, et al., "Secure Management of Operations on Protected Virtual Machines," U.S. Appl. No. 16/240,763, filed Jan. 6, 2019, 112 pages.

Search Report and Written Opinion in PCT/US2020/015510, dated May 13, 2020, 13 pages.

* cited by examiner

OVERVIEW OF OPERATION OF THE COMPUTING DEVICE
602

RECEIVE LOGIC BY A COMPUTING DEVICE. THE COMPUTING DEVICE HAS: HARDWARE RESOURCES INCLUDING A RECONFIGURABLE HARDWARE ACCELERATOR; A PRIVILEGED DOMAIN COMPONENT HAVING PRIVILEGED ACCESS TO THE HARDWARE RESOURCES; AND A HYPERVISOR FOR PROVIDING A VIRTUAL MACHINE. IN A PASS-THROUGH MODE OF OPERATION, THE COMPUTING DEVICE ENABLES THE VIRTUAL MACHINE TO DIRECTLY INTERACT WITH THE HARDWARE ACCELERATOR TO PASS INFORMATION TO AND/OR FROM THE HARDWARE ACCELERATOR.
604

DISABLE THE PASS-THROUGH MODE IN RESPONSE TO RECEIVING THE LOGIC, E.G., BY MODIFYING ADDRESS-MAPPING INFORMATION USED BY THE VIRTUAL MACHINE TO ACCESS THE HARDWARE ACCELERATOR.
606

TRANSFER STATE INFORMATION ASSOCIATED WITH THE HARDWARE ACCELERATOR TO AN EMULATOR THAT IS CONFIGURED TO EMULATE PERFORMANCE OF THE HARDWARE ACCELERATOR.
608

COMMENCE UPDATING THE HARDWARE ACCELERATOR BASED ON THE LOGIC THAT HAS BEEN RECEIVED.
610

USE THE EMULATOR TO EMULATE ONE OR MORE FUNCTIONS OF THE HARDWARE ACCELERATOR WHILE THE HARDWARE ACCELERATOR IS BEING UPDATED, INSTEAD OF USING THE VIRTUAL MACHINE TO DIRECTLY INTERACT WITH THE HARDWARE ACCELERATOR IN THE PASS-THROUGH MODE.
612

FIG. 6

OVERVIEW OF OPERATION OF THE COMPUTING DEVICE, CONTINUED
602

RECEIVE AN INDICATION THAT THE UPDATING PERFORMED BY THE HARDWARE ACCELERATOR HAS FINISHED.
702

TRANSFER STATE INFORMATION PROVIDED BY THE EMULATOR TO THE HARDWARE ACCELERATOR.
704

RE-ENABLE THE PASS-THROUGH MODE, E.G., BY RESTORING THE ADDRESS-MAPPING INFORMATION.
706

FIG. 7

OVERVIEW OF THE USE OF THE EMULATOR
802

RECEIVE A REQUEST BY THE VIRTUAL MACHINE TO ACCESS A SYSTEM PHYSICAL ADDRESS.
804

DETERMINE, BASED ON CURRENT ADDRESS-MAPPING INFORMATION PROVIDED BY A HYPERVISOR, THAT THE SYSTEM PHYSICAL ADDRESS CANNOT BE ACCESSED.
806

IN RESPONSE TO THE DETERMINING, INSTRUCT THE EMULATOR TO EMULATE A FUNCTION PERFORMED BY THE HARDWARE ACCELERATOR.
808

IN RESPONSE TO THE INSTRUCTING, EMULATE THE FUNCTION PERFORMED BY THE HARDWARE ACCELERATOR, AND EMULATE ONE OR MORE EFFECTS PRODUCED AS A RESULT OF PERFORMING THE FUNCTION.
810

FIG. 8

UPDATING HARDWARE WITH REDUCED VIRTUAL MACHINE DOWNTIME

BACKGROUND

Administrators frequently update the logic installed on computing devices provided by data centers. Once completed, these updates can improve the quality of services provided by the data center. But the updating process itself introduces various challenges. For instance, an administrator may choose to disable computing devices while updating them. This strategy may frustrate some customers, particularly those who demand that the data center provides services with a high level of availability.

SUMMARY

A technique is described herein for updating the logic used by a hardware accelerator provided by a computing device. In one implementation, the technique provides a pass-through mode which allows a virtual machine (provided by a hypervisor of the computing device) to directly interact with the hardware accelerator. Upon the commencement of an updating operation, the technique instructs an emulator to begin emulating the function(s) of the hardware accelerator and the resultant effects of these functions, without interaction with the actual hardware accelerator. When the updating operation finishes, the technique re-enables the pass-through mode.

By virtue of the above-summarized manner of operation, the technique allows the computing device to perform the function(s) associated with the hardware accelerator while the hardware accelerator is being updated. Moreover, the technique can achieve this result without adding custom functionality to the virtual machine. This aspect simplifies the adoption and maintenance of the technique in data centers.

In one implementation, the computing device consults modifiable address-mapping information to govern whether any given request by the virtual machine is handled using the pass-through mode or the emulation mode. That is, in the pass-through mode, the computing device successfully applies the address-mapping information to access valid system physical addresses used by the hardware accelerator. In the emulation mode, the computing device discovers that the address-mapping information cannot be used to translate one or more specified virtual machine addresses (associated with a request) to valid system physical addresses used by the hardware accelerator. This prompts the computing device to invoke the services of the emulator in lieu of interacting with the actual hardware accelerator. In one implementation, the virtual machine itself has no awareness of the mode that the computing device will subsequently invoke to process its request; the virtual machine assumes it is interacting with the hardware accelerator.

Based on the above-summarized manner of operation, the technique actively controls whether the computing device invokes the pass-through mode or the emulation mode by controlling the state of the address-mapping information. That is, to invoke the emulation mode, the computing device modifies the address-mapping information in such a way that it no longer maps virtual machine addresses to valid physical addresses associated with the hardware accelerator. To re-enable the pass-through mode, the computing device restores the address-mapping information to its operable state, whereupon it can again be used to link requests by the virtual machine to physical addresses associated with the hardware accelerator. The technique also transfers state information maintained by the hardware accelerator to the emulator at the start of the emulation mode. Upon the completion of the updating operation, the technique transfers current state information from the emulator to the hardware accelerator.

In one implementation, the hardware accelerator is a storage controller which facilitates the virtual machine's interaction with a collection of storage devices. Alternatively, or in addition, the hardware accelerator is a network adapter which assists the virtual machine's interaction with a computer network. Alternatively, or in addition, the hardware accelerator assists in some computation-intensive task, such as graphics processing, encryption/decryption, compression/decompression, etc.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 6 and 7 together show a flowchart that describes one manner of operation of the computing environment of FIG. 1.

FIG. 8 is a flowchart that describes a process by which an emulator is invoked.

Figure 1:
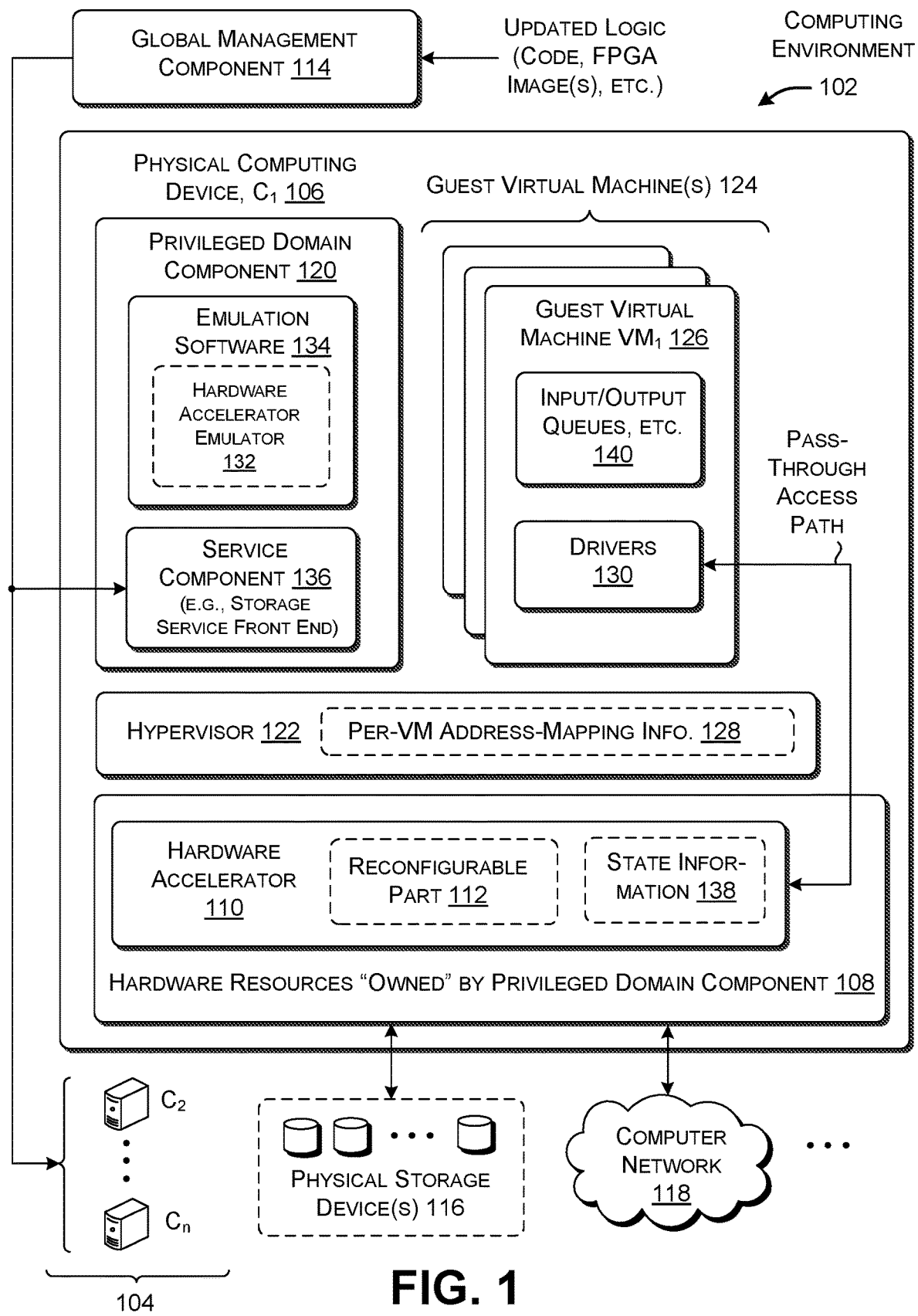
FIG. 1 shows an illustrative computing environment for updating logic used by a plurality of computing devices.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computing environment for updating logic used by hardware provided by at least one computing device. Section B sets forth illustrative methods which explain the operation of the computing environment of Section A. And Section C describes illustrative computing functionality that can be used to implement any aspect of the features described in Sections A and B.

As a preliminary matter, the term "hardware logic circuitry" corresponds to one or more hardware processors (e.g., CPUs, GPUs, etc.) that execute machine-readable instructions stored in a memory, and/or one or more other hardware logic components (e.g., FPGAs) that perform operations using a task-specific collection of fixed and/or programmable logic gates. Section C provides additional information regarding one implementation of the hardware logic circuitry. Each of the terms "component" and "engine" refers to a part of the hardware logic circuitry that performs a particular function.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic components that include a task-specific collection of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Computing Environment

FIG. 1 shows an illustrative computing environment 102 for updating hardware used by one or more computing devices 104. In one implementation, the computing environment 102 corresponds to a data center provided at a single location or distributed over plural locations. The computing devices 104 in the data center may correspond to respective servers. Customers interact with the servers of the data center via a computer network, such as the Internet. FIG. 1 shows a representative computing device 106. Although not shown, other computing devices in the computing environment 102 can include the same components as the representative computing device 106. Further, other computing devices in the computing environment 102 operate in the same manner as the representative computing device 106. In another implementation, the computing device 106 may correspond to any local computing device of any type, such as a standalone user computing device.

The representative computing device 106 includes a collection of hardware resources 108, including one or more physical processing units (e.g., CPUs), one more physical memory devices, one or more physical buses, etc. The hardware resources 108 also include at least one hardware accelerator 110. The hardware accelerator 110 facilitates one or more functions performed by the computing device 106, examples of which are provided below. The hardware accelerator 110, in turn, includes at least one part which is configurable (referred to in FIG. 1 as a "reconfigurable part" 112). For example, the reconfigurable part 112 may correspond to component having a processing unit of any type with a memory for storing firmware, control settings, parameter values, etc. For example, the reconfigurable part 112 may correspond to an Application Specific Integrated Circuit (ASIC). Alternatively, or in addition, the reconfigurable part 112 may correspond to a component having a collection of reconfigurable gates, such as a Field-Programmable Gate Array (FPGA), etc.

In the context of a data center, a global management component 114 supplies logic ("new logic") to one or more computing devices in the collection of computing devices 104. Each computing device uses the new logic to update at least its internal hardware accelerator. For example, the computing device 106 uses the new logic to update the reconfigurable part 112 of the hardware accelerator 110. This operation may correspond to storing new code, control data, parameter values, etc., and/or setting the states of reconfigurable gates. In another context, the global management component 114 supplies the new logic to standalone computers provided at different locations. Each such recipient computer again uses the new logic to update at least its internal hardware accelerator.

The hardware accelerator 110 can perform any function or combination of functions. For example, the hardware accelerator 110 can correspond to a storage controller which facilitates the storage and retrieval of information in/from one or more physical storage devices 116. More specifically, the hardware accelerator 110 can correspond to a Non-Volatile Memory Express (NVMe) controller that governs access to a collection of Solid-State Drives (SSDs). In one case, the physical storage devices 116 are implemented by one or more computing devices apart from the representative computing device 106. A local area network or point-to-point links may couple the computing device 106 to these other computing devices. Alternatively, or in addition, the physical storage devices 116 represent part of the internal hardware resources 108 of the representative computing device 106.

In another example, the hardware accelerator 110 can correspond to a network adapter that governs access to a computer network 118 (such as the Internet). In another example, the hardware accelerator 110 corresponds to a graphics processor for performing graphics processing operations (such as matrix transformations, etc.). In another example, the hardware accelerator 110 corresponds to a processing unit that performs encryption and/or decryption. In another example, the hardware accelerator 110 corresponds to a processing unit that performs compression and/or decompression. These types of hardware accelerators are cited by way of example, not limitation; other implementations can apply the principles described herein to update the logic of other kinds of hardware accelerators. Further note that the hardware accelerator 110 can perform two or more functions (such as compression and encryption), and can embody two or more kinds of reconfigurable parts (such as both a data store for storing firmware and a collection of reconfigurable gates).

In one strategy, a data center administrator controls the global management component 114 to update the hardware accelerators of all of the computing devices 104 at the same time. In another strategy, the administrator controls the global management component 114 to update subsets of the hardware accelerators in stages. For instance, the administrator can request the global management component 114 to update a subset of the computing devices 104, such as 5 percent of the computing devices 104. Upon verifying that the updated computing devices are operating in a desired manner, the administrator can request the global management component 114 to update a larger set of the computing devices.

By way of overview, the computing environment 102 implements an update strategy that aims to update each computing device's hardware accelerator while still enabling the computing device to provide its services to customers. More specifically, the update strategy aims to reduce the amount of time during the update operation in which the computing device 106 is "down," meaning it is completely unavailable for use by customers. In addition, during those times in which the computer device's services are available during the update operation, the update strategy aims to reduce the degradation of those services.

To achieve these objectives, the representative computing device 106 includes a privileged domain component 120 that has privileged access to the hardware resources 108 of the computing device 106. The computing device 106 also includes a hypervisor 122 that operates to set up and manage one or more virtual machines 124, such as representative virtual machine 126. In some implementations, the hypervisor 122 corresponds to an agent which is external to the privileged domain component 120. In other implementations, the hypervisor 122 may be considered as part of the privileged domain component 120 itself. Each virtual machine implements a virtual operating system (OS) and, optionally, one or more applications (not shown). Unlike the privileged domain, each virtual machine does not have privileged access to the hardware resources 108 of the computing device 106; rather, the hypervisor 122 manages each virtual machine's interaction with the hardware resources 108 of the computing device 106.

Each virtual machine is associated with a virtual machine address space. The computing device 106 provides first address-mapping information (not shown) that maps the virtual addresses associated with the physical CPU(s) provided by the computing device 106 to the virtual machine addresses associated with each virtual machine. Further, the hypervisor 122 stores, or otherwise provides access to, second address-mapping information 128 for each virtual machine. This address-mapping information 128 maps virtual machine addresses in a virtual machine's address space to system physical addresses. These system physical addresses encompass physical storage locations associated with the hardware accelerator 110. In one implementation, the address-mapping information 128 is implemented by one or more page tables that provide information for translating virtual machine addresses to system physical addresses. A subset of these tables may be associated with the hardware accelerator 122. Note that FIG. 1 shows that the hypervisor 122 maintains the address-mapping information 128. This is just one implementation; in other cases, the virtual machine 126 relies on address translation performed by one or more other components of the computing device 106, such as its I/O Memory Management Unit (MMU). In the most general sense, it may be said that the virtual machine 126 leverages address translation functionality provided by computing device 106, and has access to this functionality by placing virtual machine addresses on the bus.

The representative virtual machine 126 can interact with the hardware accelerator 110 in two modes: a pass-through mode and an emulation mode. In the pass-through mode, the virtual machine 126 uses one or more drivers 130 (such as an NVMe driver, a Peripheral Component Interconnect Express (PCIe) driver, etc.) to pass information (commands, data, etc.) to the hardware accelerator 110, and/or to receive information from the hardware accelerator 110. To perform this function, the virtual machine 126 relies on the address-mapping information 128 provided by the computing device 106. As noted above, that address-mapping information 128 maps virtual machine addresses associated with the virtual machine 126 to physical storage locations associated with the hardware accelerator 110.

In the emulation mode, the virtual machine 126 does not interact with the actual hardware accelerator 110; rather it interacts with a fully-emulated counterpart of the hardware accelerator 110, referred to herein as a hardware accelerator emulator 132, or "emulator" for brevity. The emulator 132 is configured to mimic the functions performed by the actual hardware accelerator 110. The emulator 132 also duplicates the effects produced by the execution of those functions. As shown in FIG. 1, the privileged domain component 120 implements the emulator 132 using an emulation software component 134.

More specifically, the virtual machine 126 uses the pass-through access path during those periods of time in which the hardware accelerator 110 is not being updated. When a service component 136 (of the privileged domain component 120) receives the new logic, the computing device 106 executes a sequence of operations to transition to the emulation mode. These operations will be described in detail below in connection with the explanation of FIG. 2. By way of overview, the computing device 106 instructs the hypervisor 122 to modify the address-mapping information 128 for each virtual machine, effectively rendering it inoperable for its intended purpose of allowing the virtual machine 126 to interact with the hardware accelerator 110. The computing device 106 also transfers state information 138 associated with the hardware accelerator 110 to the emulator 132. The state information 138 describes the current operational state of the hardware accelerator 110, e.g., as reflected by any information retained in the memory of the hardware accelerator 110, including, but not limited to, values stored in control registers, lists of incomplete work, address pointers, addresses associated with shared buffers, etc. Upon completing these operations, the virtual machine 126 uses the emulator 132 to emulate the operation of the hardware accelerator 110, rather than directly interacting with the hardware accelerator 110. Since the emulation access path does not utilize the hardware accelerator 110, the virtual machine 126 can utilize this path to perform the functions associated with the hardware accelerator 110 in parallel with the updating operation.

Figure 3:
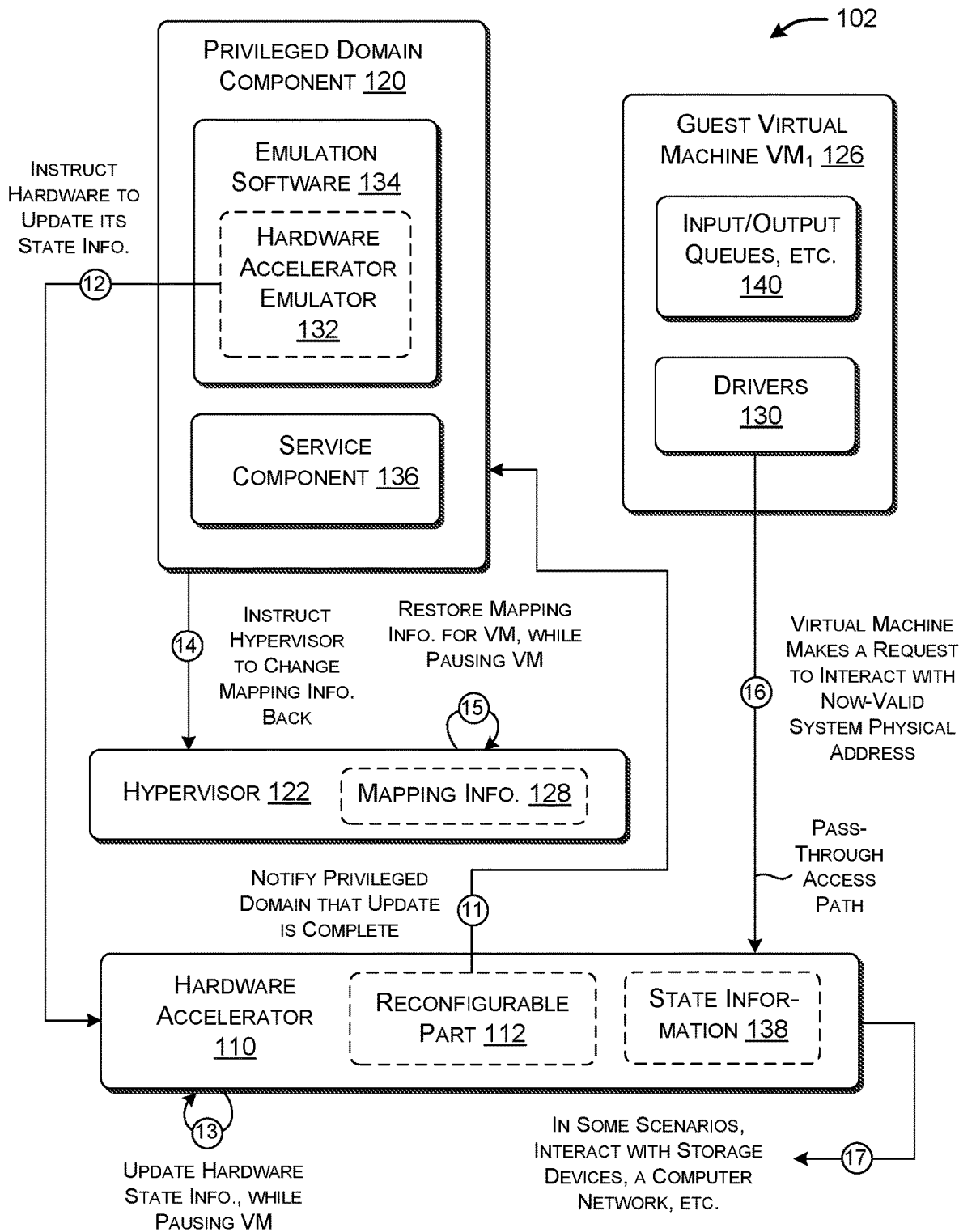

Upon completion of the update operation, the computing device 106 transitions back to the pass-through mode. FIG. 3 will illustrate how this operation is performed in detail. By way of overview, the computing device 106 transfers the current state of the emulator 132 to the hardware accelerator 110. This current state will convey the outcome of any operations executed in the emulation mode which affect the operational state of the hardware accelerator 110. The computing device 106 will also modify the address-mapping information 128 of the computing device 106, rendering it operable once more.

Finally, the representative virtual machine 126 includes one or more sets of input/output queues 140. The virtual machine 126 uses these queues 140 to transfer information to and from the hardware accelerator 110 (or the emulated counterpart of the hardware accelerator 110). The operation of this aspect of the computing device 106 will be described more fully in connection with FIG. 5 below. But this input/output mechanism is merely illustrative; other implementations can use other mechanisms to interact with the hardware accelerator 110 (or its emulated counterpart).

Figure 2:
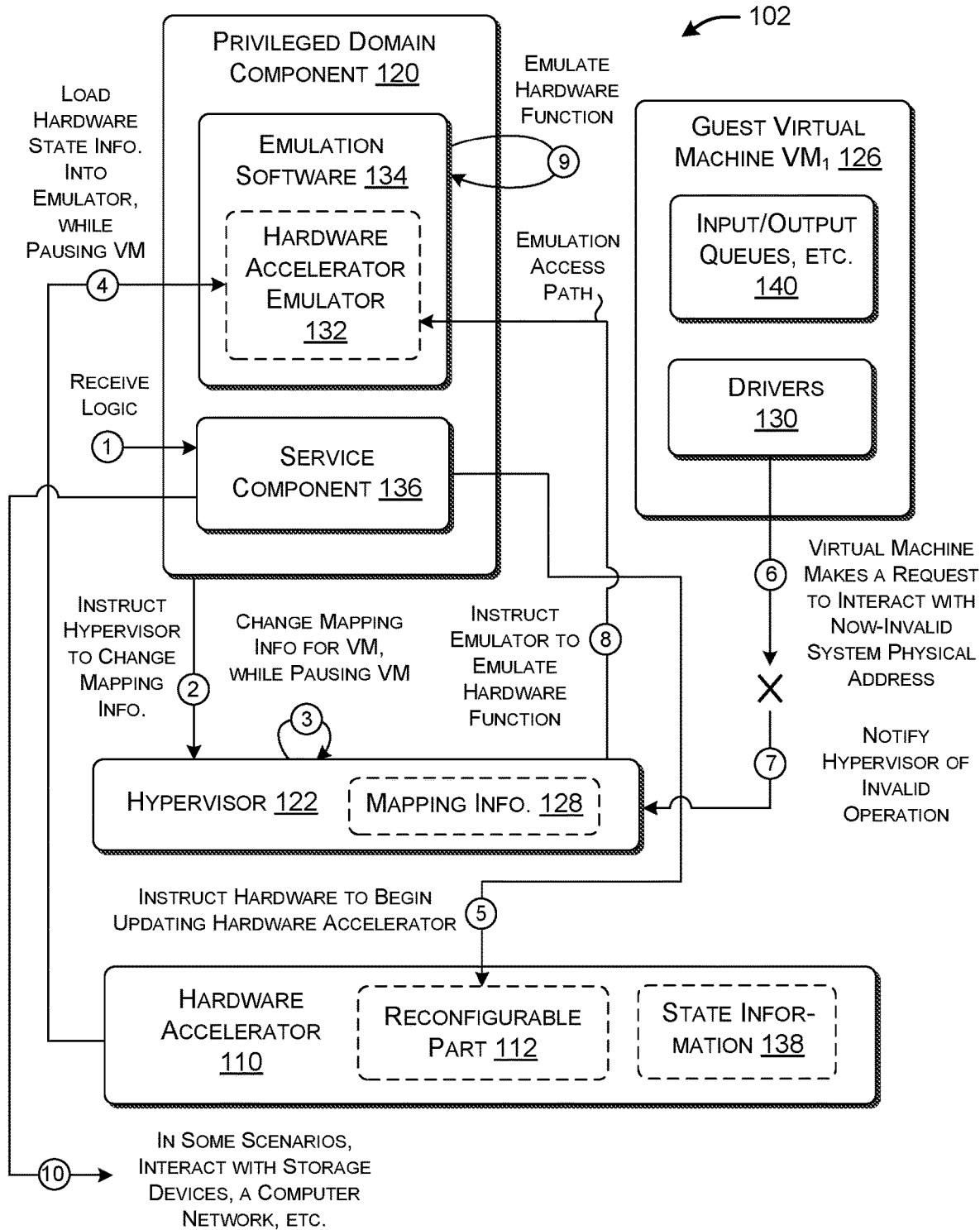
FIGS. 2 and 3 annotate the computing environment of FIG. 1 with information that conveys a sequence of operations performed by the computing environment, according to one implementation.

FIG. 2 shows a sequence of operations that the computing environment 102 of FIG. 1 can use to transition from the pass-through mode to the emulation mode. These operations will be explained with reference to the representative virtual machine 126. Although not shown, the computing device 106 performs the same operations with respect to each virtual machine managed by the hypervisor 122.

In a first operation (1), the service component 136 receives the new logic from the global management component 114, e.g., over a local area network associated with a data center. The service component 136 interprets this event as a request to update the reconfigurable part 112 of the hardware accelerator 110. FIG. 2 shows that the service component 136, which is a component of the privileged domain component 120, orchestrates the subsequent setup operations. However, this implementation is merely illustrative; in other cases, any other component(s) within the computing device 106 can perform these administrative operations.

In operation (2), the service component 136 instructs the hypervisor 122 to change the address-mapping information 128 associated with each virtual machine, including the representative virtual machine 126. To repeat once again, the address-mapping information maps virtual machine addresses to system physical addresses. The hypervisor 122 can modify each instance of address-mapping information 128 in any way that makes it incapable of translating addresses specified by the virtual machine 126 to system physical addresses associated with the hardware accelerator 110, thereby preventing the virtual machine 126 from interacting with the hardware accelerator 110. For example, the hypervisor 122 can delete those parts (e.g., pages) of the address-mapping information 128 that pertain to the hardware accelerator 110. Or it can change the physical addresses associated with those parts to mark them as invalid, or change them to dummy addresses that do not point to the hardware accelerator 110. Or the hypervisor can effectively hide the parts so they cannot be accessed, etc., making them inaccessible to the virtual machine 126. In operation (3), the hypervisor 122 modifies the address-mapping information 128, as instructed. In operation (4), the emulator 132 retrieves the state information 138 from the hardware accelerator 110. As described above, the state information 138 describes the current state of the hardware accelerator 110, e.g., including any information that is retained by the hardware accelerator 110 at the time of the mode transition.

In one implementation, the computing device 106 can pause the virtual machine 126 when it performs the above-described set-up operations (operations (2)-(4)). By doing this, the computing device 106 can ensure that the virtual machine 126 will not attempt to interact with the hardware accelerator 110 while the computing device 106 is in the process of transitioning from the pass-through mode to the emulation mode. Following these set-up operations, the computing device 106 is ready to carry out operations using the emulation mode. In operation (5), the service component 136 instructs the hardware accelerator 110 to begin the updating operation, e.g., by storing firmware, configuring gates, etc.

In operation (6), assume that the virtual machine 126 makes its first attempt to interact with the hardware accelerator 110 after the transition to the emulation mode. The virtual machine 126 does so by issuing one or more read and/or write requests to the hardware accelerator 110. For example, in one non-limiting protocol, the virtual machine 126 can update a command queue (described below). The virtual machine 126 can then send a request to update a doorbell register of the hardware accelerator 110, which alerts the hardware accelerator 110 that there is a new command for it to process. In operation (7), the computing device 106 concludes that it cannot use the address-mapping information 128 (which has been modified per operation (3)) to access the desired doorbell register. For example, the computing device 106 may conclude that it cannot use the address-mapping information 128 to translate a specified virtual machine address (associated with the doorbell register) to a physical address because the address-mapping information 128 omits the physical address, or marks it as invalid, etc. In response, the hypervisor 122 observes an exception that indicates that the virtual machine 126 has attempted to access an invalid address. In so doing, the hypervisor 122 can be said to trap the illegal memory operation requested by the virtual machine 126. In operation (8), the hypervisor 122 instructs the emulator 132 to carry out the user's desired operation.

In operation (9), the emulator 132 emulates the operation of the hardware accelerator 110. Emulation also entails duplicating the system effects that would be produced had the actual hardware accelerator 110 handled the transaction. For instance, in duplicating these effects, the emulator 132 may store the results of a computation in a specified location in the virtual machine's memory. In addition, or alternatively, the emulator 132 may set values in prescribed registers (and/or in virtual counterparts of hardware registers).

In addition, or alternatively, the emulator 132 can interact with some component that is external to the computing device 106.

More specifically, in the case of a storage controller (such as an NVMe controller), the emulator 132 can instruct the service component 136 to send information to the storage devices 116, or retrieve information from the storage devices 116. In the case of a network adapter, the emulator 132 can use a Network Interface Controller (NIC) (not shown) to send information over the computer network 118, or retrieve information from the computer network 118. In the case of a graphics processor, the emulator 132 can perform a graphics processing operation (such as an affine matrix transformation, etc.). In the case of an encryption-related accelerator, the emulator 132 can perform an encryption or decryption operation. In the case of a compression-related accelerator, the emulator 132 can perform a compression or decompression operation. These examples are described in the spirit of illustration, not limitation; still other emulation functions are possible, depending on the nature of the hardware accelerator 110 that is being emulated.

FIG. 3 shows a sequence of operations that the computer environment 102 can use to transition from the emulation mode back to the pass-through mode. In operation (11), the hardware accelerator 110 notifies the privileged domain component 120 that it has finished updating the reconfigurable part 112. In operation (12), the emulator 132 transfers its current state information to the hardware accelerator 110. In operation (13), the hardware accelerator 110 operates on the received state information by updating the state information 138. This operation may entail setting register values, request lists, shared buffer information, etc. to reflect actions taken by the emulator 132 during the update period. In other words, operation (13) entails modifying the state information 138 so that it conforms to the emulator's understanding of the current state of the hardware accelerator 110 at the end of the updating operation. In operation (14), the service component 136 instructs the hypervisor 122 to again make the address-mapping information 128 operable. In operation (15), the hypervisor 122 performs the instructed task. This may involve modifying the addresses in the address-mapping information 128 so that they once again point to valid system physical addresses, e.g., by reconstituting deleted pages, etc. Or it can constitute making a previously inaccessible mapping file accessible once more, etc. In one implementation, the computing device 106 can pause the virtual machine 126 while operations (12)-(15) are performed; this will prevent the virtual machine 126 from attempting to interact with the hardware accelerator 110 while the computing device 106 is switching modes.

At this juncture, the computing device 106 has successfully transitioned to the pass-through mode. Operation (16) represents the virtual machine's first request to interact with the hardware accelerator 110 in the pass-through mode, following the transition. In this case, the virtual machine 126 can successfully leverage the restored address-mapping information 128 to directly interact with the hardware accelerator 110. This is because the address-mapping information 128 now translates the specified virtual machine address(es) associated with the request to valid system physical addresses used by the hardware accelerator 110. Per operation (17), in some cases, the transaction performed by the virtual machine 126 will ultimately involve transfer of information to or from an external component, such as the storage devices 116 or the computer network 118.

FIGS. 2 and 3 emphasized the manner in which the virtual machine 126 leveraged the computing device's address translation functionality to interact with the hardware accelerator 110. Although not explicitly stated, note that the hardware accelerator 110 and the emulator 132 can also leverage the address translation functionality provided by the computing device 106 to interact with the virtual machine 126. Consider the illustrative example of a hardware accelerator 110 that performs an encryption function. Assume that it accepts a key and an input data item from the virtual machine 110, encrypts the data item using the key to provide an encrypted item, and then returns the encrypted item to the virtual machine 110. Further assume that the virtual machine 126 stores the encrypted item at a prescribed shared buffer location associated with a virtual machine address. Both the hardware accelerator 110 and the emulator 132 have access to the shared buffer location via the address translation functionality, and are configured to store the encrypted item at that location.

Further note that FIG. 3 pertains to the case in which the emulator 132 carries out each transaction that is invoked by the virtual machine 126 to completion, e.g., by storing data in the storage devices 116, retrieving data from the storage devices 116, and so on. In another implementation, the emulator 132 can log the requests from the virtual machine 126, but not carry out each such request to its completion. For example, the emulator 132 can log n requests to read information from the storage devices 116 and m requests to write information in the storage devices 116 during an update period, without carrying out the actual read and write operations. When the hardware accelerator 110 comes back online, in operation (12) of FIG. 3, the emulator 132 can transfer these requests to the hardware accelerator 110, along with the updated state information. The hardware accelerator 110 can then perform the actual reads and writes associated with the requests. To function in this manner, the emulator 132 incorporates an internal store (not shown) for storing pending requests to be replayed when the hardware accelerator 110 comes online. The emulator 132 also includes a data path to the hardware accelerator 110. While this implementation produces a backlog of pending requests, it still allows the virtual machine 126 to perform work while the hardware accelerator 110 is being updated.

Figure 4:
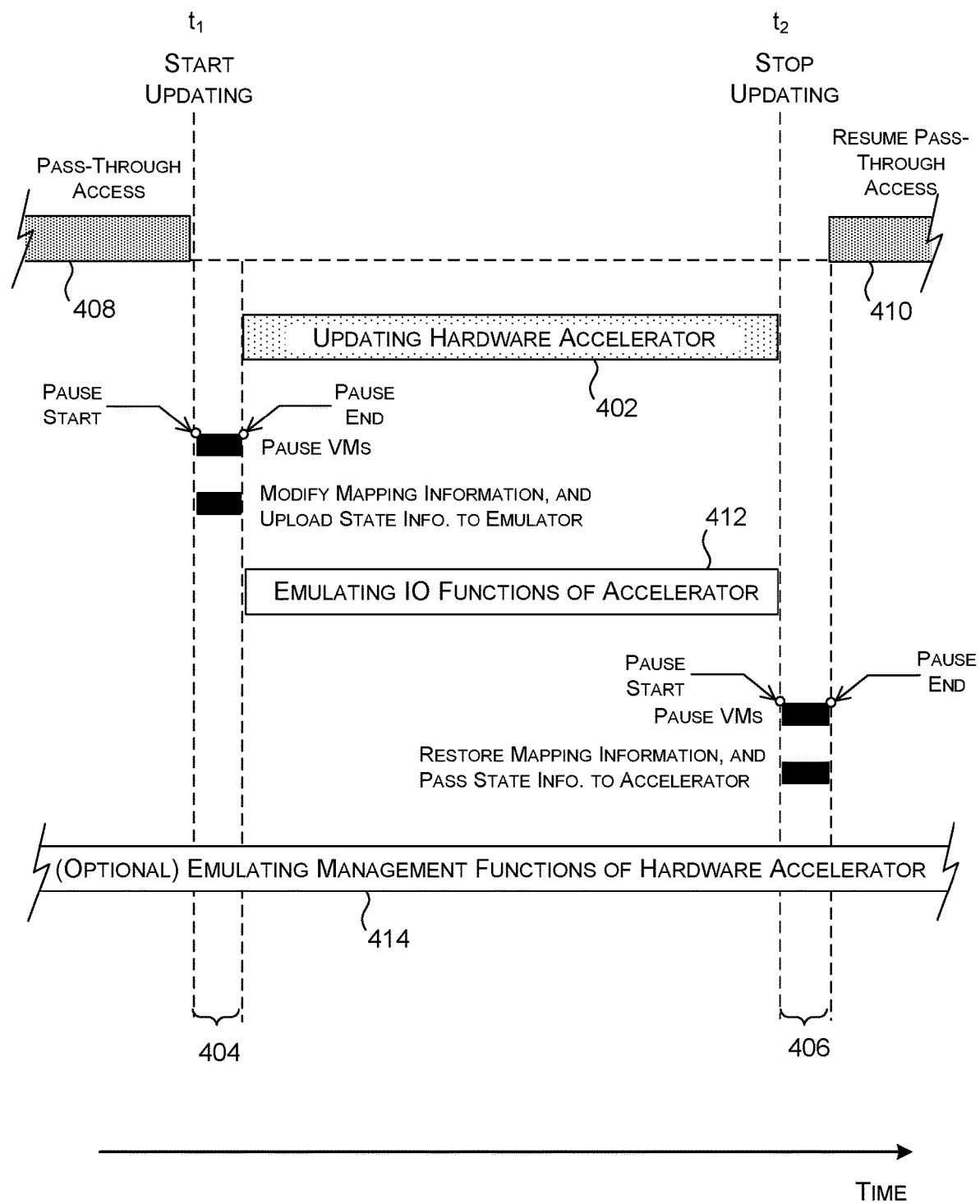
FIG. 4 is a timing diagram that shows an illustrative timing of operations performed by the computing device of FIG. 1.

FIG. 4 is a timing diagram that shows the illustrative timing of operations performed by the computing device 106 of FIG. 1. At time $t_1$, the hardware accelerator 110 starts its updating operation. At time $t_2$, the hardware accelerator 110 completes its updating operation. In a span 402 between these two times ($t_1$, $t_2$), the hardware accelerator 110 performs the updating operation, e.g., by loading firmware, setting gate states, etc.

In a span 404, the computing device 106 sets up the emulation mode, while pausing the virtual machine 126. In span 406, the computing device 106 sets up the pass-through mode, while again pausing the virtual machine 126. FIG. 4 exaggerates the lengths of these pause and set-up spans for the purposes of explanation; in actuality, these spans may be much shorter than illustrated (e.g., a fraction of a second). To pause the virtual machine 126, the computing device provides a pause start signal. To resume the virtual machine 126, the computing device 126 provides a pause end signal.

The computing device 106 can apply environment-specific logic in determining the sequencing of events involved in transitioning among modes. In one case, the computing device 106 can initiate the emulation mode by: (a) sending a pause start signal to the virtual machine 110, which prevents it from issuing new requests to the hardware accelerator 110; (b) waiting until the hardware accelerator 110 finishes any pending requests previously sent to it; (c)

performing operations (2)-(4) to modify the address-mapping information 128 and transfer the hardware accelerator's state information 138 to the emulator 132; and (d) sending a pause end signal to the virtual machine 110. The computing device 106 can initiate the pass-through mode by: (a) sending a pause start signal to the virtual machine 110, which prevents it from issuing new requests; (b) waiting until the emulator 132 finishes any pending requests previously sent to it; (c) performing operations (12)-(15) to modify the address-mapping information 128 and transfer the emulator's state information to the hardware accelerator 110; and (d) sending a pause end signal to the virtual machine 110. This series of operations is presented in the spirit of illustration, not limitation; other implementations can use other protocols to ensure a seamless transition between modes.

The computing device 106 directly interacts with the hardware accelerator 110 using the pass-through mode in spans 408 and 410. It interacts with the emulator 132 in lieu of interacting with the actual hardware accelerator 110 in span 412. Note that the emulation mode uses a software path to mimic the operation of the hardware accelerator 110. This path is not as efficient as the direct access path provided by the pass-through mode. Hence, the virtual machine 126 will exhibit some degradation in throughput performance during the span 412. Further note that the virtual machine 126 will be inaccessible during the setup spans 404 and 406. But on the whole, the computing device 106 allows updating to be performed in parallel with the span 412. This makes the updating strategy described herein more efficient than disabling the virtual machine 126 during the entire updating operation.

As another advantage, note that the updating strategy described herein does not involve any custom modifications to the software of the virtual machine 126 itself, such as by adding a paravirtualization service, a bonding layer, etc. Rather, the virtual machine 126 continues to make requests without taking account of how the computing device 106 will subsequently handle these requests. The computing device 106 automatically determines whether to rely on the pass-through mode or the emulation mode based on the current state of the address-mapping information 128. That is, the virtual machine 126 attempts to interact with the hardware accelerator 110 with respect to one or more specified virtual machine addresses. In the pass-through mode, the computing device 106 will successfully translate these addresses to valid system physical addresses associated with the hardware accelerator 110. In the emulation mode, the computing device 106 will not successfully resolve the specified addresses to valid system physical addresses, which will cause the computing device 106 to invoke the services of the emulator 132. In either case, the virtual machine 106 assumes that it is interacting with the hardware accelerator 110.

As a clarification, note that the pass-through mode and the emulation mode have been described above as binary alternatives. In that context, the computing device 106 either invokes the pass-through mode or the emulation mode, but not both. But this is not necessarily true in all cases. In other implementations, the emulator 132 can handle certain administration actions that affect the hardware accelerator 110, even while the computing device 106 uses the pass-through mode to transfer data to and from the hardware accelerator 110. A span 414 illustrates this point.

Further note that the hardware accelerator 110 itself can represent an agglomeration of different components that perform different functions. In that case, the computing device 106 can use the emulation mode to interact with an emulated version of a first component of the hardware accelerator 110 that is currently being updated, while using the pass-through mode to interact with a second component of the hardware accelerator 110 (that is not being updated). The hypervisor 122 can achieve this effect by selectively disabling only that part of the address-mapping information associated with the first component of the hardware accelerator 110. That is, the hypervisor 122 can selectively delete, disable, corrupt, or hide only those system physical addresses associated with the first component, causing the hypervisor 122 to only "trap" illegal access attempts to the first component.

Figure 5:
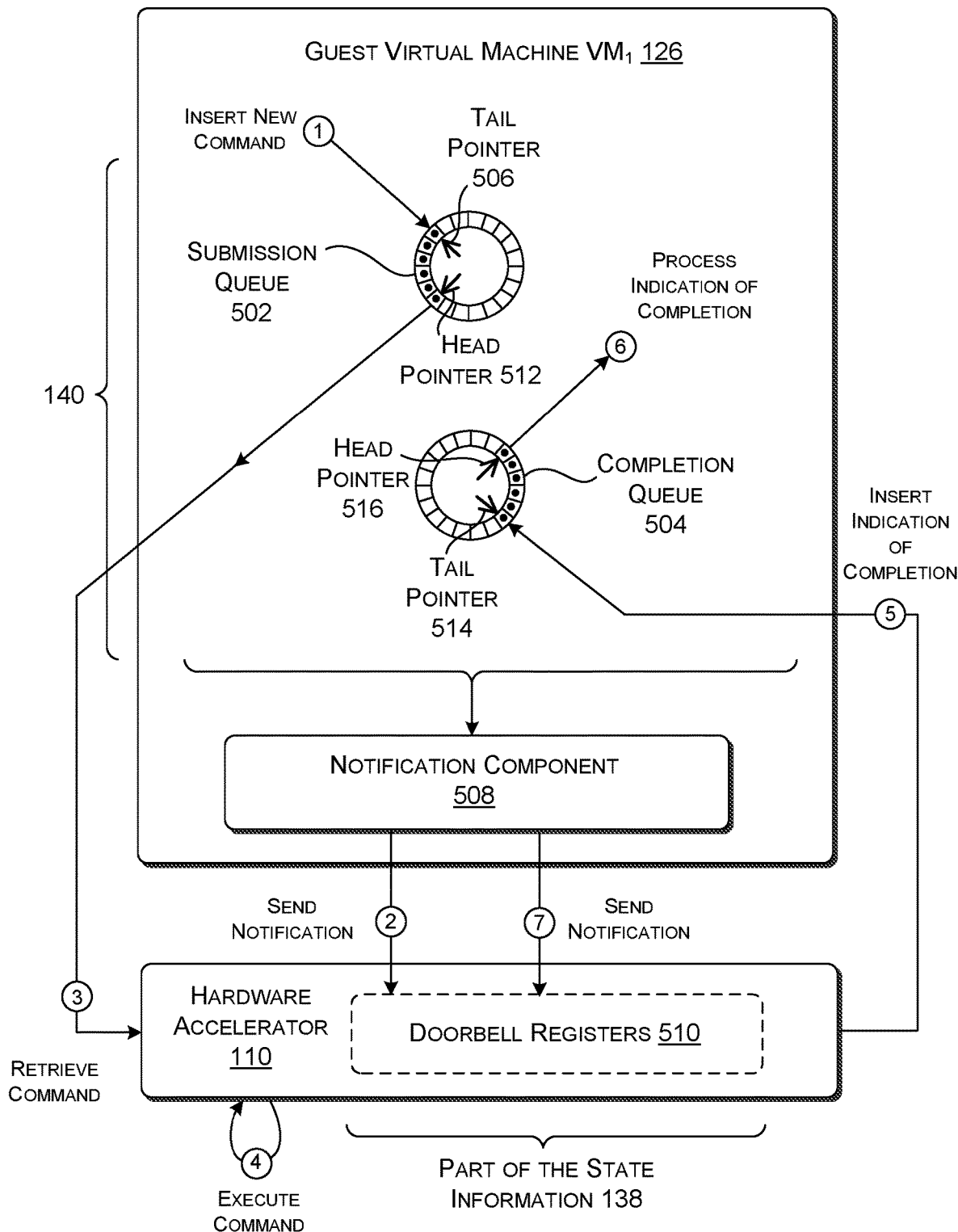
FIG. 5 shows interaction between a virtual machine and a hardware accelerator; the virtual machine and hardware accelerator correspond to two components within the computing environment of FIG. 1.

FIG. 5 shows one technique by which the virtual machine 126 can interact with the hardware accelerator 110. The virtual machine 126 includes memory which implements one or more pairs of queues 140. For example, the virtual machine 126 can virtually represent each core of each CPU provided by the computing device's hardware resources 108. The virtual machine 126 can associate at least one pair of queues with each (virtual) core.

To simplify explanation, FIG. 5 shows only one pair of queues, including a submission queue 502 and a completion queue 504. The virtual machine 126 uses the submission queue 502 to submit commands to the hardware accelerator 110. For example, in the case in which the hardware accelerator is a storage controller (e.g., an NVMe controller), one kind of command can instruct the hardware accelerator 110 to store information in the storage devices 116. Another command can instruct the hardware accelerator 110 to retrieve information from the storage devices 116. The virtual machine 126 uses the completion queue 504 to send information back to the virtual machine 126.

In one non-limiting protocol, in operation (1), the virtual machine 126 inserts a new command into the submission queue 502 at a location marked by a tail pointer 506. In operation (2), a notification component 508 (which may represent one function performed by the device drivers 130) sends a doorbell signal to a doorbell register, correspond to a register within a set of doorbell registers 510 provided by the hardware accelerator 110. The doorbell signal alerts the hardware accelerator 110 to the existence of at least one command for it to process in the submission queue 502. In operation (3), the hardware accelerator 110 retrieves a command from the submission queue 502 at a location pointed to by a head pointer 512. In operation (4), the hardware accelerator 110 executes the retrieved command, e.g., by storing information, retrieving information, comparing two pieces of information, etc.

In operation (5), the hardware accelerator 110 stores information in the completion queue 504 at a location pointed to by another tail pointer 514. This information informs the virtual machine 126 that the hardware accelerator 110 has executed a command. In operation (6), the virtual machine 126 retrieves information from the submission queue 502 at a location pointed to by another head pointer 516. In operation (7), the virtual machine 126 sends another doorbell signal to a doorbell register provided by the hardware accelerator 110. This signal informs the hardware accelerator 110 that the virtual machine 126 has processed an instance of information that the hardware accelerator 110 has previously sent to the virtual machine 126.

In the context of FIG. 2, the state information 138 that is transferred from the hardware accelerator 110 to the emulator 132 (in operation (4)) can include at least the contents of the doorbell registers 510. In the context of FIG. 3, the state information 138 that is transferred from the emulator 132 to the hardware accelerator 110 (in operation (12)) can specify the emulated contents of the doorbell registers 510, as computed by the emulator 132 during the updating operation. By virtue of these transfers, the computing device 106 can seamlessly remove the hardware accelerator 110 from a flow of operations performed by the computing device 106, and then seamlessly "reinsert" it into that flow.

B. Illustrative Processes

FIGS. 6-8 show processes that explain the operation of the computing environment 102 of Section A in flowchart form. Since the principles underlying the operation of the computing environment 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

FIGS. 6 and 7 together show a process 602 for updating logic in the hardware accelerator 110. In block 604, the computing device 106 receives new logic from the global management component 114. The computing device 106 has: hardware resources 108 including a reconfigurable hardware accelerator 110; a privileged domain component 120 having privileged access to the hardware resources 108; and a hypervisor 122 for providing at least one virtual machine 126. In a pass-through mode of operation, the computing device 106 enables the virtual machine 126 to directly interact with the hardware accelerator 110 to pass information to and/or from the hardware accelerator 110. In block 606, the computing device 106 disables the pass-through mode in response to receiving the logic, e.g., by modifying address-mapping information 128 provided by the computing device 106. In block 608, the computing device 106 transfers state information 138 associated with the hardware accelerator 110 to an emulator 132 which is configured to emulate the performance of the hardware accelerator 110. In block 610, the computing device 106 commences updating the hardware accelerator 110 based on the logic that has been received in block 604. In block 612, the computing device 106 uses the emulator 132 to emulate one or more functions of the hardware accelerator 110 while the hardware accelerator 110 is being updated, instead of using the virtual machine 126 to directly interact with the hardware accelerator 110 in the pass-through mode.

Advancing to FIG. 7, in block 702, the computing device 106 receives an indication that the updating operation performed by the hardware accelerator 110 has finished. In block 704, the computing device 106 transfers state information provided by the emulator 132 to the hardware accelerator 110. In block 706, the computing device 106 re-enables the pass-through mode.

FIG. 8 shows a process 802 that explains how block 612 of FIG. 12 operates, with respect to one attempt to access the hardware accelerator 110. In block 804, the computing device 106 receives a request by the virtual machine 126 to access a system physical address. In block 806, the computing device 106 determines, based on the current address-mapping information 128, that the system physical address cannot be accessed by the virtual machine 126. In block 808, in response to the determining operation of block 806, the computing device 106 instructs the emulator 132 to emulate a function performed by the hardware accelerator 110. In block 810, in response to the instructing operation of block 808, the emulator 132 emulates the function performed by the hardware accelerator 110; it also emulates one or more effects produced as a result of performing the function.

C. Representative Computing Functionality

Figure 9:
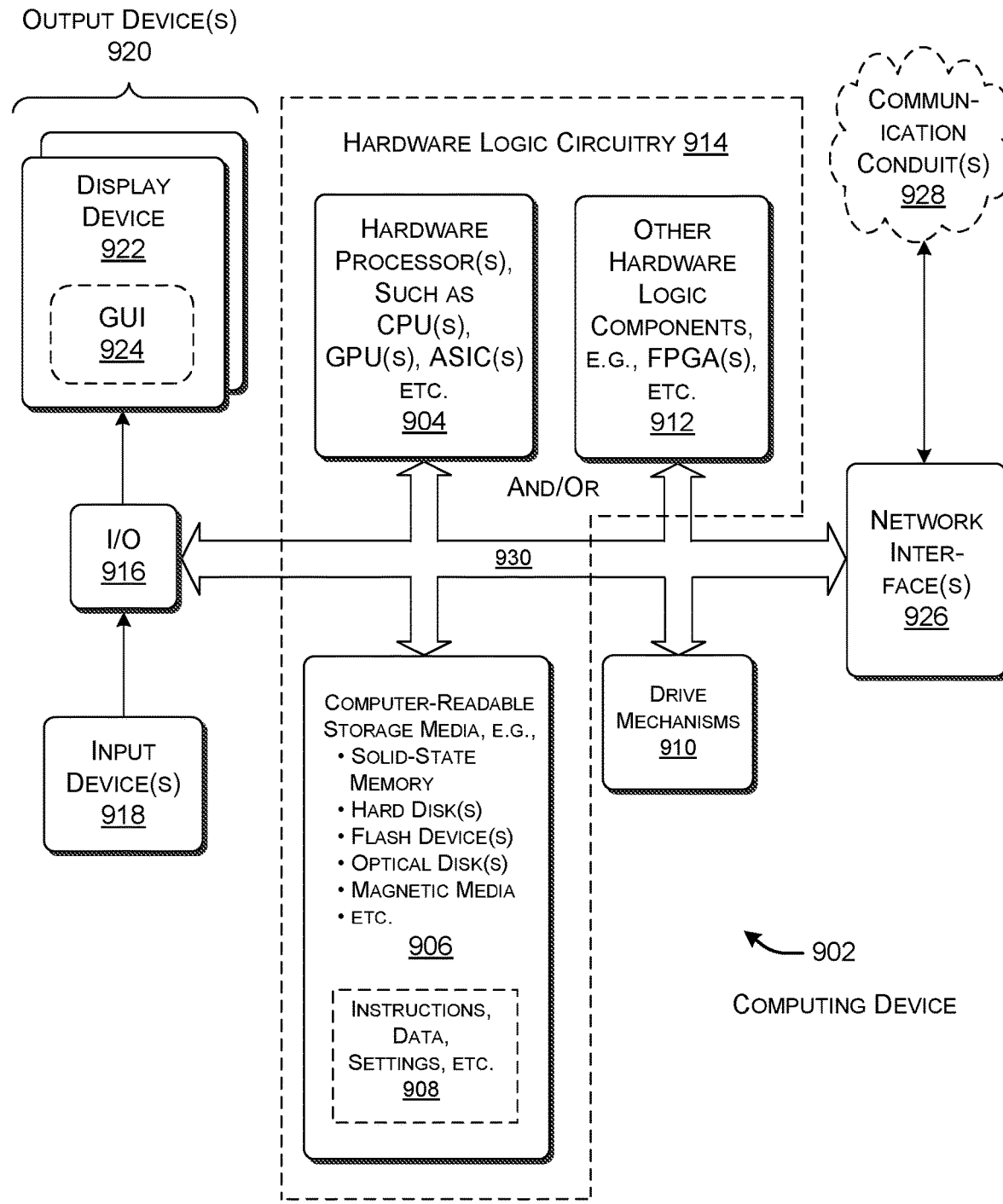
FIG. 9 shows an illustrative type of computing device that can be used to implement any aspect of the features shown in the foregoing drawings.

FIG. 9 shows a physical computing device 902 that can be used to implement any aspect of the mechanisms set forth in the above-described figures. For instance, the type of computing device 902 shown in FIG. 9 can be used to implement any computing device in the computing environment 102 shown in FIG. 1, such as the representative computing device 106. For instance, the computing device 902 may correspond to a server in a data center. In another case, the computing device 902 corresponds to a user computing device, etc.

The computing device 902 can include one or more hardware processors 904. The hardware processor(s) can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 902 can also include computer-readable storage media 906, corresponding to one or more computer-readable media hardware units. The computer-readable storage media 906 retains information 908, such as machine-readable instructions, settings, and data. The computer-readable storage media 906 may include one or more solid-state devices, one or more magnetic hard disks, one or more optical disks, magnetic tape, or other kind of physical and tangible hardware unit (including a physical memory device). The computer-readable storage media 906 may represent a fixed or removable component of the computing device 902.

The computing device 902 can utilize any instance of the computer-readable storage media 906 in different ways. For example, any instance of the computer-readable storage media 906 may represent a hardware memory unit (such as Random Access Memory (RAM)) for storing transient information during execution of a program by the computing device 902, and/or a hardware storage unit (such as a hard disk) for retaining/archiving information on a more permanent basis. In the latter case, the computing device 902 also includes one or more drive mechanisms 910 (such as a hard drive mechanism) for storing and retrieving information from an instance of the computer-readable storage media 906.

The computing device 902 may perform any of the functions described above when the hardware processor(s) 904 carry out computer-readable instructions stored in any instance of the computer-readable storage media 906. For instance, the computing device 902 may carry out computer-readable instructions to perform each block of the processes described in Section B.

Alternatively, or in addition, the computing device 902 may rely on one or more other hardware logic components 912 to perform operations using a task-specific collection of logic gates. For instance, the hardware logic component(s) 912 may include a fixed configuration of hardware logic gates, e.g., that are created and set at the time of manufacture, and thereafter unalterable. Alternatively, or in addition, the other hardware logic component(s) 912 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 9 generally indicates that hardware logic circuitry 914 includes any combination of the hardware processor(s)

904, the computer-readable storage media 906, and/or the other hardware logic component(s) 912. That is, the computing device 902 can employ any combination of the hardware processor(s) 904 that execute machine-readable instructions provided in the computer-readable storage media 906, and/or one or more other hardware logic component(s) 912 that perform operations using a fixed and/or programmable collection of hardware logic gates. More generally stated, the hardware logic circuitry 914 corresponds to one or more hardware logic components of any type(s) that perform operations based on logic stored in and/or otherwise embodied in the hardware logic component(s). In the context of FIG. 1, the hardware logic circuitry 914 is to be understood as encompassing at least the CPUs associated with the computing device 106 and, in some cases, the hardware accelerator 110.

In some cases (e.g., in the case in which the computing device 902 represents a user computing device), the computing device 902 also includes an input/output interface 916 for receiving various inputs (via input devices 918), and for providing various outputs (via output devices 920). Illustrative input devices include a keyboard device, a mouse input device, a touchscreen input device, a digitizing pad, and so on. One particular output mechanism may include a display device 922 and an associated graphical user interface presentation (GUI) 924. The computing device 902 can also include one or more network interfaces 926 for exchanging information with other devices via one or more communication conduits 928. One or more communication buses 930 communicatively couple the above-described components together.

The communication conduit(s) 928 can be implemented in any manner, e.g., by a local area computer network, a wide area computer network (e.g., the Internet), point-to-point connections, etc., or any combination thereof. The communication conduit(s) 928 can include any combination of hardwired links, wireless links, routers, gateway functionality, name servers, etc., governed by any protocol or combination of protocols.

FIG. 9 shows the computing device 902 as being composed of a discrete collection of separate units. In some cases, the collection of units may correspond to discrete hardware units provided in a computing device chassis having any form factor. In other cases, the computing device 902 can include a hardware logic component that integrates the functions of two or more of the units shown in FIG. 1. For instance, the computing device 902 can include a system on a chip (SoC or SOC), corresponding to an integrated circuit that combines the functions of two or more of the units shown in FIG. 9.

The following summary provides a non-exhaustive set of illustrative aspects of the technology set forth herein.

According to a first aspect, a computing device for updating logic in a hardware accelerator is described. The computing device includes: hardware resources including a reconfigurable hardware accelerator; a privileged domain component having privileged access to the hardware resources; and a hypervisor for providing a virtual machine. In a pass-through mode of operation, the computing device enables the virtual machine to directly interact with the hardware accelerator to pass information to and/or from the hardware accelerator. The hardware resources include hardware logic circuitry that is configured to perform operations, including: receiving logic for use in updating the hardware accelerator; disabling the pass-through mode in response to receiving the logic; transferring state information associated with the hardware accelerator into an emulator that is configured to emulate performance of the hardware accelerator; commencing updating the hardware accelerator based on the logic that has been received; and using the emulator to emulate one or more functions of the hardware accelerator while the hardware accelerator is being updated, instead of using the virtual machine to directly interact with the hardware accelerator in the pass-through mode.

According to a second aspect, the computing device hosts plural virtual machines, each having a respective virtual machine address space.

According to a third aspect, the logic includes: machine-readable instructions to be installed on the hardware accelerator; and/or data for use in configuring a collection of gates provided by the hardware accelerator.

According to a fourth aspect, the hardware accelerator is a storage controller for storing information in one or more storage devices, and/or retrieving information from the storage device(s). The one or more functions, when emulated by the emulator, involve interacting with the storage device(s) without use of the hardware accelerator.

According to a fifth aspect, the hardware accelerator is a network adapter for transmitting information over a computer network, and/or retrieving information from the computer network. The one or more functions, when emulated by the emulator, involve interacting with the computer network without use of the hardware accelerator.

According to a sixth aspect, the hardware accelerator performs: a graphics processing function; and/or an encryption and/or decryption function; and/or a compression and/or decompression function.

According to a seventh aspect, the state information specifies information retained in memory provided by the hardware accelerator, the information retained in memory defining a current state of operation of the hardware accelerator.

According to an eighth aspect, the virtual machine is associated with a virtual machine address space. In the pass-through mode of operation, the virtual machine relies on address-mapping information which maps the virtual machine address space to valid system physical addresses. The disabling operations incudes modifying the address-mapping information associated with the virtual machine so that the address-mapping information can no longer be relied on to point to valid system physical addresses, to provide updated map information.

According to a ninth aspect, dependent on the eighth aspect, the updated address-mapping information disables access by the virtual machine to all functions performed by the hardware accelerator.

According to a tenth aspect, dependent on the eighth aspect, the updated address-mapping information disables access by the virtual machine to one or more functions performed by the hardware accelerator, but not all of the functions performed by the hardware accelerator.

According to an eleventh aspect, the operation of using the emulator includes, according to one instance: receiving a request by the virtual machine to access a system physical address; determining, based on current address-mapping information provided by the computing device, that the system physical address cannot be accessed; in response to the operation of determining, instructing the emulator to emulate a function performed by the hardware accelerator; and in response to the operation of instructing, emulating the function performed by the hardware accelerator, and emulating one or more effects produced as a result of performing the function.

According to a twelfth aspect, the operations further include: receiving an indication that the updating performed by the hardware accelerator has finished; transferring state information provided by the emulator to the hardware accelerator; and re-enabling the pass-through mode.

According to a thirteenth aspect, dependent on the twelfth aspect, the operations further include pausing the virtual machine each time the address-mapping information is altered.

According to a fourteenth aspect, a method for updating logic in a hardware accelerator is described. The method includes: receiving logic by a computing device, the computing device having: hardware resources including a reconfigurable hardware accelerator; a privileged domain component having privileged access to the hardware resources; and a hypervisor for providing a virtual machine. In a pass-through mode of operation, the computing device enables the virtual machine to directly interact with the hardware accelerator to pass information to and/or from the hardware accelerator. The method further includes: disabling the pass-through mode in response to receiving the logic; transferring state information associated with the hardware accelerator to an emulator that is configured to emulate performance of the hardware accelerator; commencing updating the hardware accelerator based on the logic that has been received; using the emulator to emulate one or more functions of the hardware accelerator while the hardware accelerator is being updated, instead of using the virtual machine to directly interact with the hardware accelerator in the pass-through mode; receiving an indication that the updating performed by the hardware accelerator has finished; transferring state information provided by the emulator to the hardware accelerator; and re-enabling the pass-through mode.

According to a fifteenth aspect, dependent on the fourteenth aspect, the virtual machine is associated with a virtual machine address space. In the pass-through mode of operation, the virtual machine relies on address-mapping information which maps the virtual machine address space to valid system physical addresses. The operation of disabling includes modifying the address-mapping information associated with the virtual machine so that the address-mapping information can no longer be relied on to point to valid system physical addresses. The operation of re-enabling includes changing the address-mapping information so that the address-mapping information can once again be relied on to point to valid system physical addresses.

According to a sixteenth aspect, dependent on the fourteenth aspect, the operation of using the emulator includes, in one instance: receiving a request by the virtual machine to access a system physical address; determining, based on current address-mapping information provided by the computing device, that the system physical address cannot be accessed; in response to the operation of determining, instructing the emulator to emulate a function performed by the hardware accelerator; and, in response to the operation of instructing, emulating the function performed by the hardware accelerator, and emulating one or more effects produced as a result of performing the function.

According to a seventeenth aspect, dependent on the fourteenth aspect, the hardware accelerator is a storage controller for storing information in one or more storage devices, and/or retrieving information from the storage device(s). The one or more functions, when emulated by the emulator, involve interacting with the storage device(s) without use of the hardware accelerator.

According to an eighteenth aspect, dependent on the fourteenth aspect, the hardware accelerator is a network adapter for transmitting information over a computer network, and/or retrieving information from the computer network. The one or more functions, when emulated by the emulator, involve interacting with the computer network without use of the hardware accelerator.

According to a nineteenth aspect, a computer-readable storage medium is described for storing computer-readable instructions. The computer-readable instructions, when executed by one or more hardware processors, perform a method that includes receiving logic by a computing device. The computing device has: hardware resources including a reconfigurable hardware accelerator; a privileged domain component having privileged access to the hardware resources; and a hypervisor for providing a virtual machine, the virtual machine being associated with a virtual machine address space. In a pass-through mode of operation, the computing device enables the virtual machine to directly interact with the hardware accelerator to pass information to and/or from the hardware accelerator. In the pass-through mode, the virtual machine relies on address-mapping information, provided by the computing device, which maps the virtual machine address space to valid system physical addresses. The method further includes: disabling the pass-through mode in response to receiving the logic, the operation of disabling being performed by modifying the address-mapping information so that the address-mapping information can no longer be relied on to point to valid system physical addresses; transferring state information associated with the hardware accelerator into an emulator that is configured to emulate performance of the hardware accelerator, the emulator running in the privileged domain component; commencing updating the hardware accelerator based on the logic that has been received; and using the emulator to emulate one or more functions of the hardware accelerator while the hardware accelerator is being updated, instead of using the virtual machine to directly interact with the hardware accelerator in the pass-through mode.

According to a twentieth aspect, dependent on the nineteenth aspect, the method further includes: receiving an indication that the updating performed by the hardware accelerator has finished; transferring state information provided by the emulator to the hardware accelerator; and re-enabling the pass-through mode.

A twenty-first aspect corresponds to any combination (e.g., any logically consistent permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system for updating logic in a hardware accelerator, comprising:
   hardware resources including the hardware accelerator, the hardware accelerator being reconfigurable;
   an emulator having privileged access to the hardware resources; and
   a hypervisor for providing a virtual machine,
   in a pass-through mode of operation, the computing system enabling the virtual machine to directly interact with the hardware accelerator to pass information to and/or from the hardware accelerator,
   the hardware resources including hardware logic circuitry that is configured to perform operations of the computing system, the operations including:
      receiving logic for use in updating the hardware accelerator;
      disabling the pass-through mode in response to receiving the logic;
      transferring state information associated with the hardware accelerator into the emulator, the emulator being configured to emulate performance of the hardware accelerator;
      commencing updating the hardware accelerator based on the logic that has been received; and
      using the emulator to emulate one or more functions of the hardware accelerator while the hardware accelerator is being updated, instead of using the virtual machine to directly interact with the hardware accelerator in the pass-through mode.

2. The computing system of claim 1, wherein the computing system hosts plural virtual machines, each having a respective virtual machine address space.

3. The computing system of claim 1, wherein the logic includes:
   machine-readable instructions to be installed on the hardware accelerator; and/or
   data for use in configuring a collection of gates provided by the hardware accelerator.

4. The computing system of claim 1, wherein:
   the hardware accelerator is a storage controller for storing information in one or more storage devices, and/or retrieving information from said one or more storage devices, and
   said one or more functions, when emulated by the emulator, involve interacting with the said one or more storage devices without use of the hardware accelerator.

5. The computing system of claim 1, wherein:
   the hardware accelerator is a network adapter for transmitting information over a computer network, and/or retrieving information from the computer network, and
   said one or more functions, when emulated by the emulator, involve interacting with the computer network without use of the hardware accelerator.

6. The computing system of claim 1, wherein the hardware accelerator performs:
   a graphics processing function; and/or
   an encryption and/or decryption function; and/or
   a compression and/or decompression function.

7. The computing system of claim 1, wherein the state information specifies information retained in memory provided by the hardware accelerator, the information retained in memory defining a current state of operation of the hardware accelerator.

8. The computing system of claim 1, wherein:
   the virtual machine is associated with a virtual machine address space,
   in the pass-through mode of operation, the virtual machine relies on address-mapping information which maps the virtual machine address space to valid system physical addresses, and
   said disabling comprises modifying the address-mapping information associated with the virtual machine so that the address-mapping information can no longer be relied on to point to valid system physical addresses, to provide updated map information.

9. The computing system of claim 8, wherein the updated address-mapping information disables access by the virtual machine to all functions performed by the hardware accelerator.

10. The computing system of claim 8, wherein the updated address-mapping information disables access by the virtual machine to one or more functions performed by the hardware accelerator, but not all of the functions performed by the hardware accelerator.

11. The computing system of claim 1, wherein said using the emulator comprises, according to one instance:
    receiving a request by the virtual machine to access a system physical address;
    determining, based on current address-mapping information provided by the computing system, that the system physical address cannot be accessed;
    in response to said determining, instructing the emulator to emulate a function performed by the hardware accelerator; and
    in response to said instructing, emulating the function performed by the hardware accelerator, and emulating one or more effects produced as a result of performing the function.

12. The computing system of claim 1, wherein the operations further comprise:
    receiving an indication that said updating performed by the hardware accelerator has finished;
    transferring state information provided by the emulator to the hardware accelerator; and
    re-enabling the pass-through mode.

13. The computing system of claim 12, wherein the operations further comprise pausing the virtual machine each time the address-mapping information is altered.

14. A method for updating logic in a hardware accelerator, comprising:
    receiving logic by a computing system, the computing system having:
       hardware resources including the hardware accelerator, the hardware accelerator being reconfigurable;
       an emulator having privileged access to the hardware resources; and
       a hypervisor for providing a virtual machine,
       in a pass-through mode of operation, the computing enabling the virtual machine to directly interact with the hardware accelerator to pass information to and/ or from the hardware accelerator;
    disabling the pass-through mode in response to receiving the logic;
    transferring state information associated with the hardware accelerator to the emulator, the emulator being configured to emulate performance of the hardware accelerator;

commencing updating the hardware accelerator based on the logic that has been received;

using the emulator to emulate one or more functions of the hardware accelerator while the hardware accelerator is being updated, instead of using the virtual machine to directly interact with the hardware accelerator in the pass-through mode;

receiving an indication that said updating performed by the hardware accelerator has finished;

transferring state information provided by the emulator to the hardware accelerator; and re-enabling the pass-through mode.

15. The method of claim 14, wherein:

the virtual machine is associated with a virtual machine address space, in the pass-through mode of operation, the virtual machine relies on address-mapping information which maps the virtual machine address space to valid system physical addresses, said disabling comprises modifying the address-mapping information associated with the virtual machine so that the address-mapping information can no longer be relied on to point to valid system physical addresses, and said re-enabling comprises changing the address-mapping information so that the address-mapping information can once again be relied on to point to valid system physical addresses.

16. The method of claim 14, wherein said using the emulator comprises, in one instance:

receiving a request by the virtual machine to access a system physical address;

determining, based on current address-mapping information provided by the computing system, that the system physical address cannot be accessed;

in response to said determining, instructing the emulator to emulate a function performed by the hardware accelerator; and in response to said instructing, emulating the function performed by the hardware accelerator, and emulating one or more effects produced as a result of performing the function.

17. The method of claim 14, wherein:

the hardware accelerator is a storage controller for storing information in one or more storage devices, and/or retrieving information from said one or more storage devices, and said one or more functions, when emulated by the emulator, involve interacting with the said one or more storage devices without use of the hardware accelerator.

18. The method of claim 14, wherein:

the hardware accelerator is a network adapter for transmitting information over a computer network, and/or retrieving information from the computer network, and said one or more functions, when emulated by the emulator, involve interacting with the computer network without use of the hardware accelerator.

19. A computer-readable storage medium for storing computer-readable instructions, the computer-readable instructions, when executed by one or more hardware processors, performing a method that comprises:

receiving logic by a computing system, the computing system having:

hardware resources including a hardware accelerator that is reconfigurable;

an emulator having privileged access to the hardware resources; and a hypervisor for providing a virtual machine, the virtual machine being associated with a virtual machine address space, in a pass-through mode of operation, the computing system enabling the virtual machine to directly interact with the hardware accelerator to pass information to and/or from the hardware accelerator, in the pass-through mode, the virtual machine relying on address-mapping information, provided by the computing system, which maps the virtual machine address space to valid system physical addresses;

disabling the pass-through mode in response to receiving the logic, said disabling being performed by modifying the address-mapping information so that the address-mapping information can no longer be relied on to point to valid system physical addresses;

transferring state information associated with the hardware accelerator into the emulator, the emulator being configured to emulate performance of the hardware accelerator;

commencing updating the hardware accelerator based on the logic that has been received; and using the emulator to emulate one or more functions of the hardware accelerator while the hardware accelerator is being updated, instead of using the virtual machine to directly interact with the hardware accelerator in the pass-through mode.

20. The computer-readable storage medium of claim 19, wherein the method further includes:

receiving an indication that said updating performed by the hardware accelerator has finished;

transferring state information provided by the emulator to the hardware accelerator; and re-enabling the pass-through mode.

* * * * *